US011868513B2

(12) United States Patent
Dover et al.

(10) Patent No.: US 11,868,513 B2
(45) Date of Patent: Jan. 9, 2024

(54) PHYSICAL UNCLONABLE FUNCTION AT A MEMORY DEVICE

(71) Applicant: Micron Technology, Inc., Boise, ID (US)

(72) Inventors: Lance W. Dover, Fair Oaks, CA (US); Olivier Duval, Pacifica, CA (US)

(73) Assignee: Micron Technology, Inc., Boise, ID (US)

( * ) Notice: Subject to any disclaimer, the term of this patent is extended or adjusted under 35 U.S.C. 154(b) by 347 days.

(21) Appl. No.: 17/283,628

(22) PCT Filed: Dec. 27, 2019

(86) PCT No.: PCT/US2019/068726
§ 371 (c)(1),
(2) Date: Apr. 8, 2021

(87) PCT Pub. No.: WO2020/142371
PCT Pub. Date: Jul. 9, 2020

(65) Prior Publication Data
US 2021/0350032 A1 Nov. 11, 2021

Related U.S. Application Data

(60) Provisional application No. 62/786,753, filed on Dec. 31, 2018.

(51) Int. Cl.
*G06F 21/79* (2013.01)
*G06F 12/14* (2006.01)
(Continued)

(52) U.S. Cl.
CPC .......... *G06F 21/79* (2013.01); *G06F 12/1408* (2013.01); *G06F 12/1433* (2013.01);
(Continued)

(58) Field of Classification Search
CPC ........ G06F 21/79; G06F 21/602; G06F 21/64; G06F 21/73; G06F 21/107; G06F 12/1408; G06F 12/1433
See application file for complete search history.

(56) References Cited

U.S. PATENT DOCUMENTS 7,505,577 B2 * 3/2009 Annadata ............ H04M 3/5235
379/265.09
2015/0234751 A1 8/2015 Van Der Sluis et al.
(Continued)

FOREIGN PATENT DOCUMENTS

CN 104584435 4/2015
CN 106778205 5/2017
(Continued)

OTHER PUBLICATIONS

"International Application Serial No. PCT/US2019/068726, International Search Report dated Apr. 29, 2020", 3 pgs.
(Continued)

*Primary Examiner* — Matthew T Henning
(74) *Attorney, Agent, or Firm* — Schwegman Lundberg & Woessner, P.A.

(57) ABSTRACT

Various examples are directed to systems and methods for providing a digital fingerprint of a selected portion of a memory device to a host device. A host device executing at a host device may send a to a driver a command to produce digital fingerprint data. The command may include an output pointer indicating a memory location of the local memory. The driver may generate a modified command that does not include the output pointer. The driver may send the modified command to a memory device. The driver may receive a reply comprising the digital fingerprint data and write the
(Continued)

digital fingerprint data to a location at the memory location of local memory of the host device indicated by the output pointer.

20 Claims, 8 Drawing Sheets

(51) Int. Cl.
  *G06F 21/60* (2013.01)
  *G06F 21/64* (2013.01)
  *G06F 21/73* (2013.01)
  *G06F 21/10* (2013.01)

(52) U.S. Cl.
  CPC ............ *G06F 21/602* (2013.01); *G06F 21/64* (2013.01); *G06F 21/73* (2013.01); *G06F 21/107* (2023.08)

(56) References Cited

U.S. PATENT DOCUMENTS

| | | |
|---|---|---|
| 2016/0364583 A1 | 12/2016 | Benoit et al. |
| 2017/0344761 A1 | 11/2017 | Jennings et al. |
| 2018/0004444 A1 | 1/2018 | Murray et al. |
| 2018/0129802 A1 | 5/2018 | Cambou |
| 2018/0278413 A1 | 9/2018 | Dover |
| 2018/0307867 A1 | 10/2018 | Dover |

FOREIGN PATENT DOCUMENTS

| | | |
|---|---|---|
| CN | 113518978 | 10/2021 |
| TW | 201822062 A | 6/2018 |
| TW | I627555 B | 6/2018 |
| TW | 202032406 A | 9/2020 |
| TW | I734314 | 7/2021 |
| WO | WO-2020142371 A1 | 7/2020 |

OTHER PUBLICATIONS

"International Application Serial No. PCT/US2019/068726, Written Opinion dated Apr. 29, 2020", 5 pgs.

"SRAM PUF: The Secure Silicon Fingerprint", Intrinsic ID, (2017), 6 pgs.

"Taiwanese Application Serial No. 108147297, Office Action dated Sep. 15, 2020", w/ English translation, 16 pgs.

"Taiwanese Application Serial No. 108147297, Response filed Dec. 14, 2020 to Office Action dated Sep. 15, 2020", w/ English Claims, 46 pgs.

England, Paul, et al., "A Foundation for Trust in the Internet of Things", Microsoft Corporation, (Apr. 21, 2016), 17 pgs.

"International Application Serial No. PCT US2019 068726, International Preliminary Report on Patentability dated Jul. 15, 2021", 7 pgs.

"Chinese Application Serial No. 201980092819.6, Office Action dated Oct. 19, 2023", with machine English translation, 11 pages.

* cited by examiner

PHYSICAL UNCLONABLE FUNCTION AT A MEMORY DEVICE

PRIORITY APPLICATION

This application is a U.S. National Stage Application under 35 U.S.C. 371 from International Application No. PCT/US2019/068726 filed Dec. 27, 2019, published as WO 2020/142371, which claims the benefit of priority to U.S. Provisional Application Ser. No. 62/786,753, filed Dec. 31, 2018, all of which are incorporated herein by reference in their entirety.

TECHNICAL FIELD

Examples described herein generally relate to systems and methods for managing a physical unclonable function (PUF) at a system comprising a host device and a memory device.

BACKGROUND

Various computing devices utilize cryptographic keys to secure stored data, authenticate commands, and for other purposes. Generating and securely storing cryptographic keys at a computing device, or component thereof, can generate considerable challenges, however.

BRIEF DESCRIPTION OF THE DRAWINGS

In the drawings, which are not necessarily drawn to scale, like numerals may describe similar components in different views. Like numerals having different letter suffixes may represent different instances of similar components. Some examples are illustrated by way of example, and not limitation, in the figures of the accompanying drawings in which.

DETAILED DESCRIPTION

Figure 1:
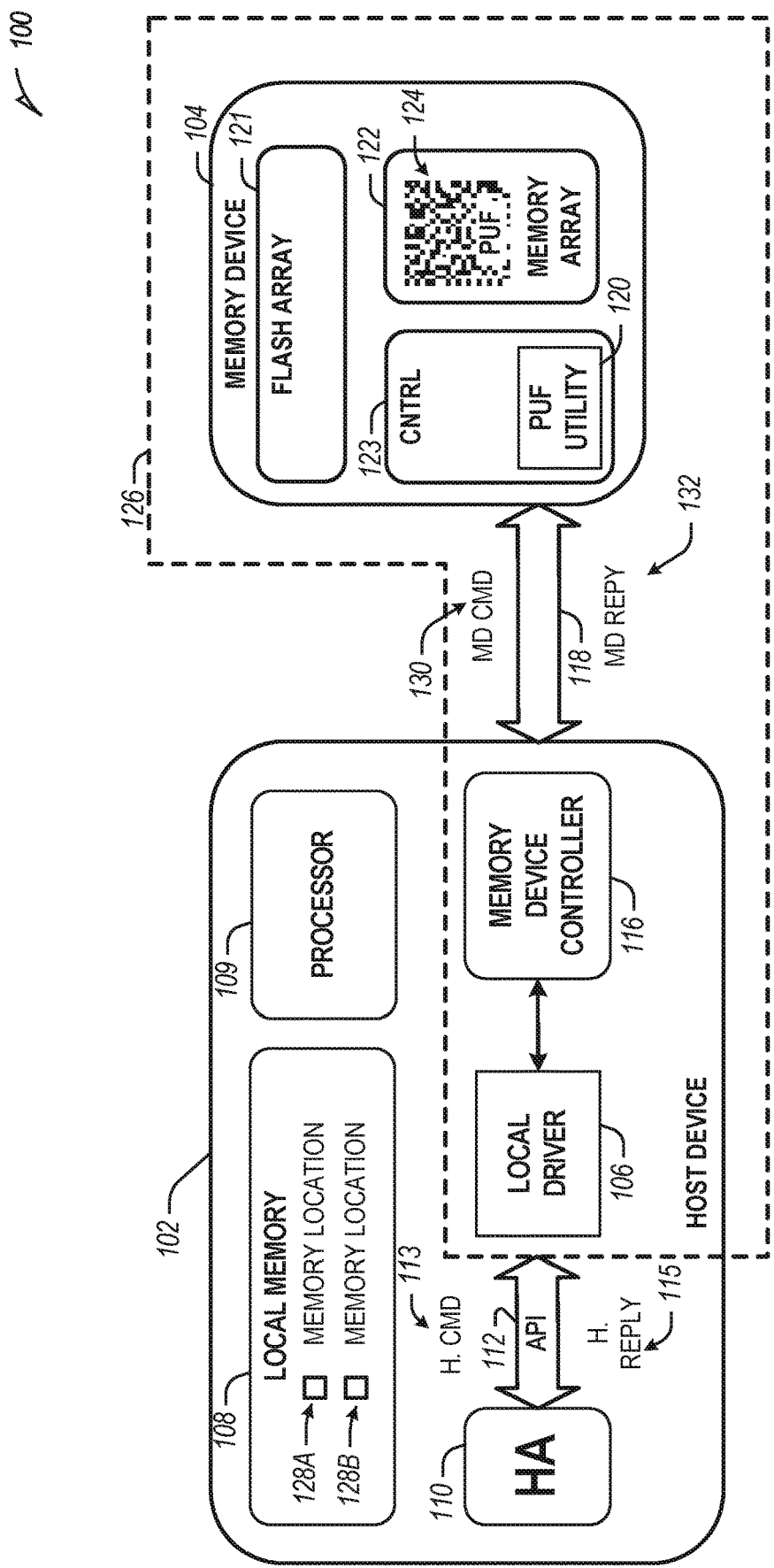
FIG. 1 is a diagram showing one example of an environment including a host device and a memory device, with a physical unclonable function (PUF) implemented at the memory device.

In the following description, for purposes of explanation, numerous specific details are set forth in order to provide a thorough understanding of some examples. It will be evident, however, to one skilled in the art that the present disclosure may be practiced without these specific details.

A PUF is an electrically readable, non-programmed, digital fingerprint derived from a selected portion of a semiconductor device under selected access conditions. In many examples, the digital fingerprint will be a function of manufacturing variations of individual semiconductor die that result in die-specific variations. The digital fingerprint may include parameters such as default states or other properties of a group of memory cells (such as at power up), signal propagation delays (or other characteristics) within a circuit, etc.

In some examples, a PUF is based on small process variations in the manufacture of memory and other semiconductor devices can cause otherwise similar semiconductor devices to exhibit slightly different behavior. These small differences in behavior can detected and used to generate PUF data. PUF data is data includes or is derived from the digital fingerprint described above. PUF data can be used, for example, to generate cryptographic keys and to generate random or pseudorandom numbers.

In various examples, a PUF is implemented by a PUF utility executing at the device that includes the subject semiconductor components. The PUF utility reads the digital fingerprint of the selected portion of the semiconductor device. The PUF utility returns the digital fingerprint as PUF data or, in some examples, modifies the digital fingerprint to generate the PUF data. For example, the PUF utility can convert a digital fingerprint in to a form having a suitable size for use as a cryptographic key, random number, or other application.

Consider an example in which the subject semiconductor components include synchronous random access memory (SRAM) memory cells. In this example, the PUF utility reads the initial logical states of the SRAM memory cells on start-up and translates the read values into PUF data of a suitable size. Consider another example, in which the subject semiconductor components include NAND memory cells. In this example, the PUF utility reads the NAND memory cells to detect a distribution of threshold voltages. The distribution of threshold voltages is used to generate PUF data. PUF data generated by the PUF utility can be used for a number of different purposes including, for example, as random numbers, as cryptographic keys or as bases for generating cryptographic keys, etc.

The PUF utility responds to commands from various other applications or utilities. For example, one or more commands can instruct the PUF utility to generate digital fingerprint data, such as a PUF. Other commands to the PUF utility can instruct the PUF utility to perform actions related to the generation of PUF data. Example commands to the PUF utility can include commands to prepare or initialize the subject semiconductor components for reading of the digital fingerprint, commands to read the digital fingerprint and generate corresponding PUF or other digital fingerprint data, and commands to return data about the PUF utility, such as version data.

Various examples described herein are directed to systems and methods for implementing a PUF at an external memory device. Implementing a PUF at a memory device, for example, as opposed to implementing the PUF directly at a host device creates challenges that are addressed by the systems and methods described herein.

To illustrate the challenges of implementing a PUF at an external memory device, consider the arrangement in which the PUF is implemented locally at a host device (and not at an external memory device). In this arrangement, local SRAM cells of the host device are used as the selected portion of the semiconductor device that is the basis of the PUF. In this arrangement, the PUF utility and applications that consume PUF data generated by the PUF utility are both executed at the host device. The host device can implement an application programming interface (API) that is used by the application to send commands directly to the PUF utility. Further, the PUF utility can map the results of a command, if any, to a memory at the host device where the results are accessed by the requesting application using pointers or indirection.

When the PUF is implemented externally, however, the SRAM cells or other selected portions of a semiconductor device used to generate the PUF digital fingerprint are implemented at a memory device that is external to the host device. For example, the host device can be formed on a first semiconductor chip. The memory device can be formed on a second semiconductor chip. The host device and memory device can communicate on a bus between the first and second semiconductor chips. In some examples, the host device is or includes a system on a chip (SoC) and the memory device is or includes an embedded Multi-Media Controller (eMMC).

In this arrangement, commands to the PUF utility from applications executing at the host device may be vulnerable to interception and/or spoofing when transmitted from the host device to the PUF utility at the external memory device. Also, sensitive PUF data may be vulnerable to interception when transmitted from the PUF utility at the external memory device to the requesting application at the host device. Further, because the PUF utility executes at the external memory device, it may not have access to the local memory of the host device. This may prevent the PUF utility from mapping command results to the host device memory using pointers and/or indirection.

Various examples described herein address these and other challenges by executing a local driver at the host device. The local driver may be configured to receive host commands directed to the PUF utility by applications executing at the host device. The local driver receives a host command from the host application. The host command may include parameters, such as output pointer parameters. Output pointer parameters are pointers to the local memory map of the host device that indicate a location where the host application expects to access PUF data after the command is executed. The host command can also include input parameters that include or refer to data that is used by the PUF to execute a command. Input parameters can be directly included in the host command or passed indirectly with an input parameter pointer that points to a memory location at the local memory map.

Upon receiving the host command, the local driver generates a modified command. In some examples, the modified command is digitally signed, for example, using a cryptographic key or keys that are trusted or known by both the host device and the external memory device. The modified command may also exclude output pointer parameters.

For example, the local driver may store the output pointer parameters at the host device for use later, as described herein. The local driver directs the modified command to the external memory device.

The PUF utility at the external memory device executes the modified command. If the modified command generates an output, such as PUF data, the PUF utility returns the output (e.g., including PUF data) to the local driver. Upon receiving the output, the local driver retrieves the stored output pointer parameter or parameters provided with the host command and writes the output to a local memory at the host device at a location or locations referenced by the output pointer parameter or parameters. In this way, the host application can utilize pointers and/or indirection to access the PUF data.

FIG. 1 is a diagram showing one example of an environment 100 including a host device 102 and a memory device 104, with a PUF 124 implemented at the memory device 104. The host device 102 is in communication with the memory device 104 via a communication interface 118. The host device 104 and/or the memory device 104 can be included in a variety of products such as Internet of Things (IoT) devices (e.g., refrigerators or other appliances, sensors, motors, actuators, mobile communications devices, automobiles, drones, etc.), network appliances (e.g., routers, switches, etc.), or any other suitable products to support processing, communications, or control of the product. In some examples, the host device 105 and memory device 104 are included on a common circuit board or package. In some examples, the host device 102 is or includes a system on a chip (SoC) and the memory device 104 is or includes an eMMC in communication with the SoC.

In the example of FIG. 1, the host device 102 includes a processor 109 and a local memory 108. The processor 109 can be or include any suitable hardware processor. The local memory 108 can be or include any suitable type of memory including, for example, SRAM, other suitable RAM, or other suitable data storage. In some examples, the host device 102 also includes a memory device controller 116 for communicating with the memory device 104 via the communications interface 118.

The memory device 104 includes one or more controllers 123 configured to perform logic functions for operating the memory device and/or interfacing with the host device 102 via the communications interface 118. The memory device 104 also includes a memory array 122 that can implement the PUF 124. The memory array 122 can include a number of blocks or of memory cells. The memory array 122 can include memory cells of any suitable type including, for example, SDRAM. In some examples, the memory device 104 also includes a flash memory array 121 separate from the memory array 122. For example, the memory array 122 may be an SRAM array utilized by the controller 123 to manage the flash memory array 121.

Referring back to the host device 102, the processor 109 executes a host application 110. The host application 110 can be any suitable application or utility executing at the host device 102 to perform any suitable functions. In some examples, the host application 110 is an operating system (OS) of the host device 102.

The processor 109 also executes a local driver 106. The local driver 106 implements an application program interface (API) 112 for communicating with the host application 110. The API 112 can support a set of host commands 113 and host replies 115. A host command 113 is a command provided by the host application 110. A host command 113 can include input parameters, included directly or referenced by pointers. The host command 113 can also include output pointers referencing locations at the local memory 108 where the host application 110 is to access PUF data resulting from the command. The API 112 can also support one or more host replies 115. A host reply is a response to a command generated by a PUF utility. For example, a reply can include PUF data. Not all commands cause a PUF utility to generate a reply. The host reply 115 is a reply provided to the host application 110. A host reply 115 can incorporate PUF data resulting from a command and/or can indicate that PUF data resulting from a command is mapped to the local memory 108, as described herein.

The local driver 106 is configured to receive host commands 113 from the host application 110. The host commands 113 can be received directly from the host application 105 or, in some examples, can be provided through an OS of the host applications. Some host commands 113 include parameters while others may not. For example, a host command 113 requesting that the PUF 124 be stopped may not include parameters. A host command 113 requesting a cryptographic key may include one or more input parameters describing the requested cryptographic key and one or more output pointer parameters that point to memory locations 128A, 128B at the local memory 108. Output pointer parameters can indicate to the local driver 106 where to write or otherwise map PUF data generated in response to the host command 113.

Upon receiving a host command 113, the local driver 106 generates memory device (MD) commands 130. MD commands 130 are transmitted to the memory device 104 via the communications interface 118. In some examples, the local driver 106 provides MD commands 130 to the memory device controller 116, which manages the communication interface 118 with the memory device. The memory device controller 116 provides the MD commands 130 to the memory device 104 (e.g., the PUF utility 120 thereof.)

MD commands 130 can be similar to the host commands 113 but directed to the memory device 104. In some examples, MD commands 130 are modified from the originating host command 113. For example, the local driver 106 can modify a host command 113 to strip output pointer parameters. (The local driver 106 stores the stripped output pointer parameters for later use, as described herein.) In some examples, the local driver 106 can also cryptographically sign MD commands 130, for example, using a cryptographic key to generate a message authentication code (MAC) or hash message authentication code (HMAC). The MAC or HMAC can be shared with the memory device 104, as described herein. In some examples, if an MD command 130 includes one or more input parameters, the local driver encrypts the input parameter or parameters.

A PUF utility 120 at the memory device 104 receives and executes MD commands 130. The PUF utility 120 can be executed at the controller 123 of the memory device 104. The PUF utility 120 can be configured, as described herein, to verify received MD commands 130. If an MD command 130 includes one or more input parameters that are encrypted, the PUF utility 120 can decrypt the input parameter or parameters and use them to execute the command 130.

Upon executing a MD command 130, the PUF utility 120 can provide an MD reply 132 to the local driver 106. The MD reply 132 can include status data describing the status of the command such as, for example, whether the command was successfully executed. The PUF utility 120 can be configured to cryptographically sign the reply. For example, the PUF utility 120 can generate a MAC or HMAC using the MAC or HMAC cryptographic key. Some MD commands 130 return PUF data such as, for example, an activation code, a cryptographic key, etc. The PUF utility 120 can be configured to encrypt the PUF data for transmission to the local driver 106. The encrypted PUF data can be part of the MD reply 132 cryptographically signed by the PUF utility 120.

The local driver 106 can receive the MD reply 132 directly and/or via the memory device controller 116. The local driver 106 can verify the cryptographic signature of the MD reply 132. In examples, where the MD reply 132 includes PUF data, the local driver 106 can decrypt the PUF data, as described herein. Verifying the commands 113, 130 and replies 132, 115 as well as encrypting parameters and PUF data, as described herein, can implement a security boundary 126 at the environment 100 that includes the local driver 106 and the memory device 104. This can reduce security risks associated with implementing the PUF 124 external to the host device 102.

Upon decrypting PUF data, the local driver 106 can write or otherwise map the decrypted output, such as PUF data, to the memory location or locations 128A, 128B indicated by the output pointer parameter or parameters associated with the original host command 113. In this way, the host application 110 can access the output at the local memory 108. The local driver 106 can also send a host reply 115 to the host application 110. The host reply 115 can indicate that the host command 113 was successfully executed (or not, as the case may be). Upon receiving a host reply 115, the host application 110 may access the output data at the local memory 108 using the output pointer parameter or parameters passed with the host command 113.

The local driver 106 and PUF utility 120 can support various commands to be performed at the PUF 124. An instantiate command instructs the memory device 104 to create the PUF and prepare it for use. An instantiate command can originate from the host application 110 as a host command 113 or can be implemented directly by the local driver 106 as a MD command 130 upon start-up of the local driver 106. Additional details of an example instantiate command are provided herein, for example, with respect to operation 308 of the process flow 300. For example, an instantiate command can include an allocation size input parameter indicating the size of the PUF 124 (e.g., the number of memory cells at the memory array 122 that will be used to implement the PUF 124). The instantiate command can also include a host public key input parameter indicating a host public key that the PUF utility 120 will use to encrypt PUF data resulting from other commands. In some examples, the host public key is provided associated with a digital certificate that can be verified by the PUF utility 120. The instantiate command can also include a monotonic counter input parameter indicating the monotonic counter that the PUF utility 120 should use to generate PUF data. The PUF utility 120 executes the instantiate command and generates a MD reply 132 indicating the success or failure of the command. The local driver 106 can similarly generate a host reply 115 indicating the success or failure of the command.

A product information command can be directed to the PUF 124 and returns PUF data describing the PUF 124 and/or PUF utility 120. A product information host command 113 can include output pointer parameters corresponding to expected PUF data to be generated but may not include any input parameters. Accordingly, a product information MD command 130 may not include any parameters. A MD reply 132 to a product information command can include the PUF data describing the PUF 124 and/or PUF utility 120 such as, for example, one or more of a product identification, a PUF version, a PUF revision, a PUF build number, etc. The local driver 106 can decrypt this PUF data and write it to the locations at the local memory 108 indicated by the output pointer parameters included with the initial host command. The local driver 106 can generate a host reply 115 indicating the success or failure of the command.

An initialize command can confirm that the PUF has been correctly instantiated. An initialize host command 113 can include an output pointer parameter to an actual PUF size and a size input parameter indicating a desired PUF size. The local driver 106 generates a MD command 130 that includes the desired PUF size input parameter. The PUF utility 120, upon receiving the MD command 130, verifies that instantiated size of the PUF 124 matches the desired PUF size parameter and, if so, returns PUF data indicating the actual PUF size. The local driver 106 writes the PUF data to the location at the local memory 108 corresponding to the output pointer parameter. The local driver 106 can also generate a host reply 115 indicating the success or failure of the command.

An enroll command can prompt the PUF utility 120 to use the PUF to generate an activation code. The activation code is PUF data that can be subsequently used, for example, as a parameter for different commands for generating a cryptographic key, random number, etc. An enroll host command 113 can include an output pointer parameter for receiving the activation code PUF data. The local driver 106 can generate a MD command 130 that may not include any parameters. The PUF utility 120 uses the PUF 124 to generate the activation code and returns the activation code as PUF data with a MD reply 132. The local driver 106 writes the activation code to the memory location at the local memory 108 indicated by the output pointer parameter and generates a host reply 115 indicating the success or failure of the command.

A start command provides the PUF 124 with a previously-generated activation code and prepares it to receive additional commands. A start host command 113 includes an activation code input parameter. The local driver 106 generates a MD command 130 including the activation code as an input parameter. The PUF utility 120 starts the PUF 124 using the activation code and returns a MD reply 132 indicating success (or failure) of the start command. The local driver 106 subsequently generates a host reply 115 indicating the success or failure of the command.

A stop command stops the PUF 124 and may disable the PUF 124 until it is re-started. A stop host command 113 may not include any parameters. The local driver 106 can generate and pass a stop MD command 130, that may also be devoid of parameters. The PUF utility can execute the stop command and provide a MD reply 132 indicating the success or failure of the command. The local driver 106 can also generate a host reply 115 indicating the success or failure of the command.

A get key command is used to generate a cryptographic key using the PUF 124. A get key host command 113 can include various parameters including a key type input parameter indicating the type of key that is requested (e.g., a cryptographic key type) and, in some examples, an index input parameter. A get key host command 113 can also include an output pointer parameter for receiving the cryptographic key. The local driver 106 generates a MD command 130 that includes the key type input parameter and the index input parameter. The PUF utility 120 uses the PUF 124 to generate the requested key type using index and returns key as PUF data in an MD reply 132. The local driver 106 writes the cryptographic key to the location at the local memory 108 indicated by the output pointer parameter and sends a host reply 115 to the host application 110.

Another example host command 113 can request a cryptographic signature for data provided as an input parameter. For example, the host command 113 can include payload data. In response to the host command 113, the PUF utility 120 generates a cryptographic signature of the payload data, for example, utilizing a cryptographic key generated from the PUF 124, as described herein. The input parameters may also include an output pointer parameter for receiving the cryptographic signature.

Figure 2:
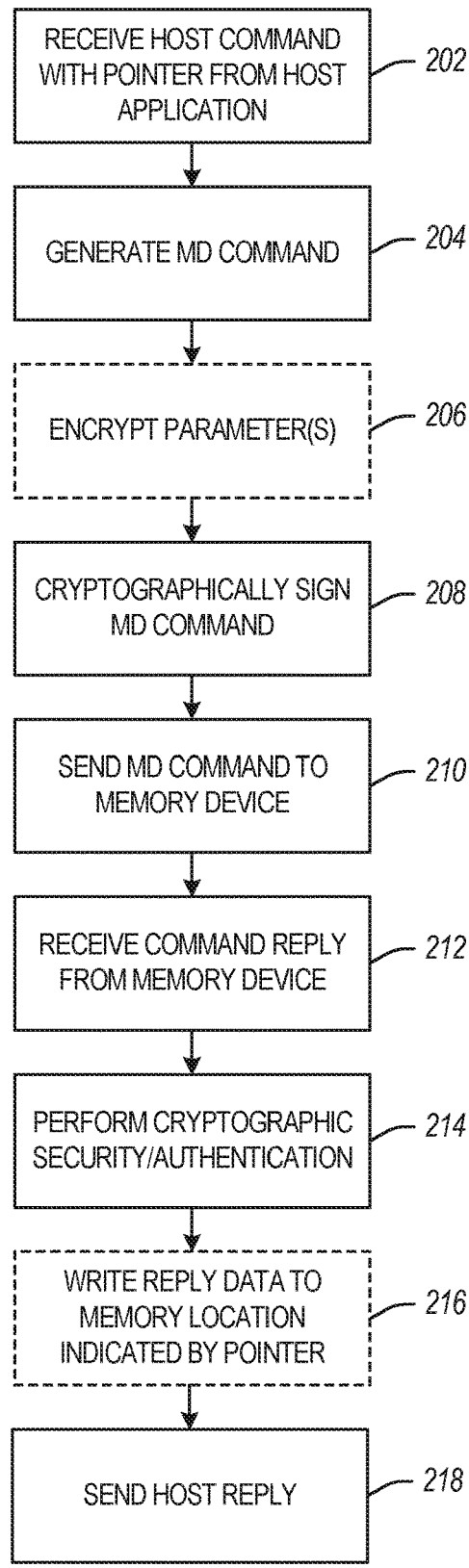
FIG. 2 is a flowchart showing one example of a process flow that can be performed by the local driver of FIG. 1 to manage the PUF implemented at a memory device.

FIG. 2 is a flowchart showing one example of a process flow 200 that can be performed by the local driver 106 executed at the host device 102 to manage the PUF 124 implemented at the memory device 104. At operation 202, the local driver 106 receives a host command 113 from the host application 110. The host command 113 can be received directly from the host application 110 and/or via an OS of the host device 102. The host command 113 may include one or more parameters including, for example, input parameters and output pointer parameters. Input parameters can be included with the host command 113 or provided as pointers to memory locations 128A, 128B at the local memory 108.

At operation 204, the local driver 106 generates a MD command 130. This can include, for example, removing output pointer parameters from the host command 113. The output pointer parameters can be stored locally at the host 102, for example, at a secure memory location associated with the local driver 106. In examples where input parameters are included with the host command 113 as pointers, the local driver 106 accesses the memory locations 128A, 128B at the local memory 108 including the input parameters and incorporates the input parameters directly into the MD command 130.

At optional operation 206, the local driver 106 encrypts any input parameters of the MD command 130. For example, if the host command 113 included input parameters, those input parameters can be encrypted. The input parameters can be encrypted using any suitable symmetric or asymmetric encryption scheme including, for example, Data Encryption Standard (DES), Rivest-Shamir-Aldeman (RSA), Advanced Encryption Standard (AES), etc. In some examples, a symmetric scheme, such as RSA, is used and the local driver 106 encrypts input parameters using a memory device public key of the memory device 104 and/or PUF utility 120. The PUF utility 120 can later decrypt the parameters, as described herein, using a memory device private key corresponding to the public key. If the MD command 130 does not include any parameters, then the operation 206 may not be performed.

At operation 208, the local driver 106 cryptographically signs the MD command 130. Similar to the encryption at operation 206, the cryptographic signing at operation 208 can be performed using a symmetric key or a set of asymmetric keys. If asymmetric keys are used, the local driver 106 can generate a digital signature using the MD command 130 and its private key. The PUF utility 120, as described herein, can authenticate the digital signature using a public key associated with the local driver 106. In examples where a symmetric key is used, both the local driver 106 and the PUF utility 120 have copies of the same symmetric key. The local driver 106 generates a digital signature, for example, by applying a hash or other cryptographic function to the MD command 130 using the symmetric key. The resulting cryptographic signature is, in some examples, referred to as a MAC or HMAC.

At operation 210, the local driver 106 sends the MD command 130, including the cryptographic signature, to the memory device 104 (e.g., the PUF utility 120 thereof). The memory device 104 executes the MD command and sends an MD reply 132, which the local driver 106 receives at operation 212. The MD reply 132 can include a status, indicating whether the MD command 130 was successfully executed. In examples in which the MD command 130 generates PUF data, the MD reply 132 also includes the PUF data (which may be encrypted).

At operation 214, the local driver 106 verifies the MD reply 132. For example, the reply 132 can include a cryptographic signature, such as a MAC or HMAC. The local driver 106 utilizes an appropriate cryptographic key to verify the cryptographic signature. In examples where the reply 132 includes PUF data, the local driver 106 can also decrypt the PUF data, for example, using a private key associated with the host device 102 and/or a symmetric key shared with the memory device 104.

At optional operation 216, the local driver 106 writes the PUF data, if any, to the memory location or locations 128A, 128B corresponding to the output pointer parameter or parameters included with the host command 113. For example, the local driver 106 may retrieve the pointer parameter, stored during generation of the modified command. At operation 218, the local driver 106 sends a status message to the host application 110 indicating that the host command 113 has been executed. The host application 110 may subsequently access the PUF data (if any) in the PUF data at the local memory 108.

Figure 3:
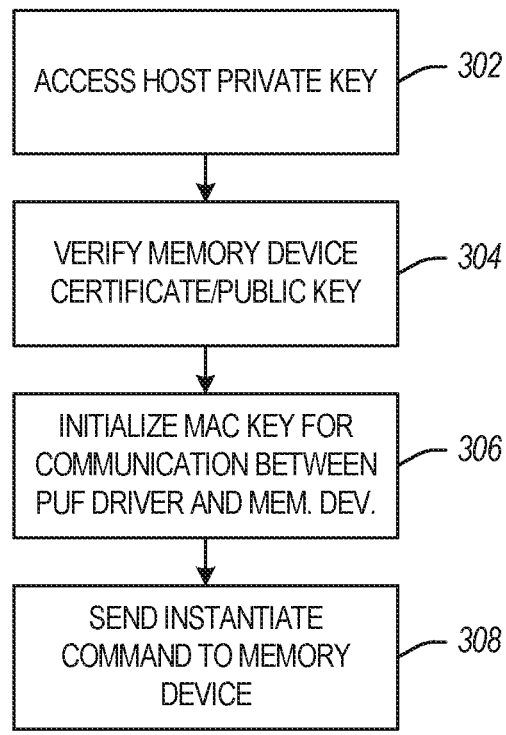
FIG. 3 is a flowchart showing one example of a process flow that can be executed by the local driver of FIG. 1 to initialize for managing the PUF implemented at the memory device.

FIG. 3 is a flowchart showing one example of a process flow 300 that can be executed by the local driver 106 to initialize for managing the PUF 124 at the memory device 104. The local driver 106 can perform the process flow 300 to prepare to respond to host commands 113, as described herein. In some examples, the local driver 106 executes the process flow 300 upon startup.

At operation 302, the local driver 106 accesses a host private key. The host private key can be stored, for example, at a key register associated with the processor 109 and/or the local memory 108. The host private key can be used to decrypt PUF data received in MD replies 132.

At operation 304, the local driver 106 verifies a memory device certificate including a public key for the memory device 104 (a memory device public key). In some examples, the memory device certificate is cryptographically signed by a certificate authority utilizing a private key of the certificate authority. Verifying the memory device certificate can include using a public key of the certificate authority to confirm that the cryptographic signature of the memory device certificate was generated using the certificate authority's private key. The memory device certificate can include the memory device public key that the local driver 106, upon verification, can use to encrypt MD command 130 parameters, as described herein.

At operation 306, the local driver 106 can initialize a symmetric MAC key. This can include agreeing with the memory device 104 on a shared secret. Initializing the symmetric MAC key can be performed, for example, using any suitable key exchange algorithm. The local driver 106 can store the symmetric MAC key, for example, at a key register associated with the processor 109 and/or local memory 108.

At operation 308, the local driver 106 sends an instantiate MD command 130 to the memory device 104. The instantiate MD command 130 instructs the memory device 104 (e.g., the PUF utility 120) to generate the PUF 124. For example, the instantiate MD command 130 can include parameters such as, for example, the size of the PUF. Another example parameter of the instantiate MD command 130 can be a host public key that the PUF utility 120 can use to encrypt PUF data provided to the local driver 106. The host public key can correspond to the host private key accessed at operation 302.

Figure 4:
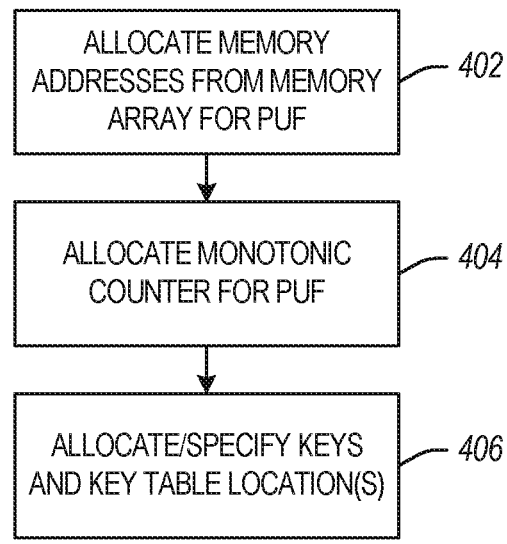
FIG. 4 is a flowchart showing one example of a process flow that can be executed by a PUF utility at the memory device of FIG. 1 to instantiate the PUF.

FIG. 4 is a flowchart showing one example of a process flow 400 that can be executed by the PUF utility 120 to instantiate the PUF 124, for example, in response to an instantiate MD command 130 received from the local driver 106. At operation 402, the PUF utility 120 allocates a set of memory addresses from the memory array 122 for the PUF 124. At operation 404, the PUF utility allocates one or more monotonic counters at the memory device 104 for the PUF 124. At operation 406, the PUF utility allocates cryptographic keys for managing the PUF 124 to particular key register locations, for example, at the controller 123 and/or at the memory array 122. For example, the symmetric MAC key received from the local driver 106 can be stored at one key register location. The symmetric MAC key can be used to cryptographically verify MD commands 130 and to digitally sign MD replies 132. A memory device private key associated with the memory device digital certificate (verified at operation 304) can be stored at another key register location. The memory device private key can be used to decrypt MD command 130 parameters encrypted by the local driver 106 using the memory device public key.

Figure 5:
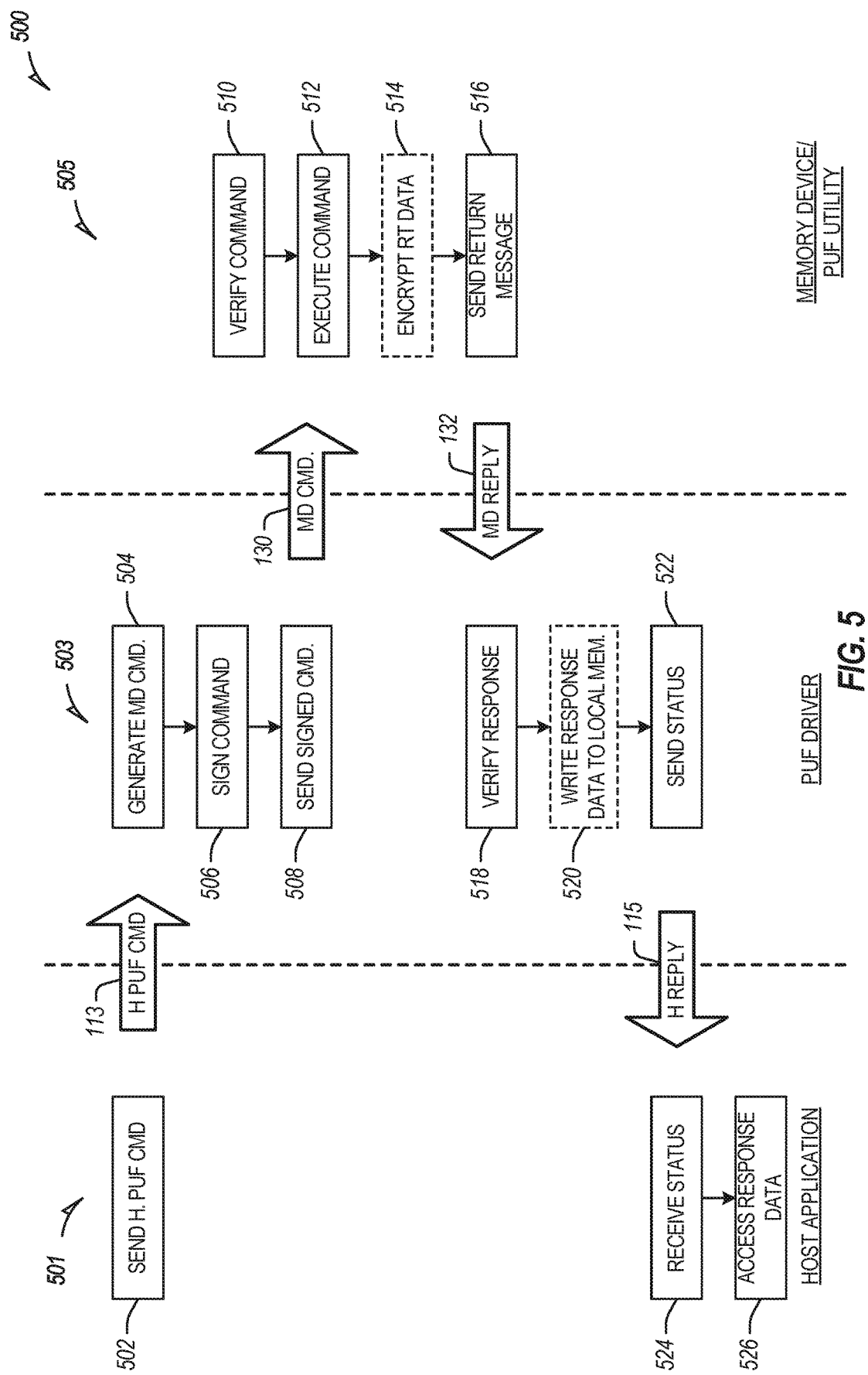
FIG. 5 is a flowchart showing one example of a process flow that can be executed in the environment of FIG. 1 to execute a command to generate digital fingerprint data (e.g., PUF data).

FIG. 5 is a flowchart showing one example of a process flow 500 that can be executed in the environment 100 of FIG. 1 to execute a command. The process flow 500 includes three columns 501, 503, 505. The column 501 includes operations that can be executed by the host application 110. The column 503 includes operations that can be performed by the local driver 106. The column 505 includes operations that can be performed by the memory device 104 (e.g., the PUF utility 120 thereof).

At operation 502, the host application 110 sends a host command 113 to the local driver 106. The host command 113 can request that a command be performed at the PUF 124, such as one of the example commands described herein. Depending on the command requested, the host command 113 can include one or more parameters. Parameters can include input parameters that will be used to execute the command, as well as output pointer parameters. Output pointer parameters can point to memory locations 128A, 128B at the local memory 108 where the host application 110 expects PUF data to be located after execution of the command. Input parameters can be included in the command 113 directly, or indirectly via pointers to local memory 108.

The local driver 106 receives the host command 113 and, at optional operation 504, it generates a MD command 130. Generating the MD command 130 can include removing output pointer parameters from the host command 113. The output pointer parameters can be stored and used later to write PUF data resulting from the command to the indicated memory locations 128A, 128B. In some examples, the output pointer parameters are stored with an indication of the generated MD command 130 such as, for example, a hash of some or all of the MD command 130. The indication of the generated MD command 130 is used later to retrieve the output pointer parameters upon receiving a reply 132 to the MD command 130. Generating the MD command 130 can also include encrypting input parameters (if any). In examples in which the input parameters are provided indirectly via one or more pointers, the local driver 106 can access values for the relevant input parameters from the local memory 108 prior to encrypting.

At operation 506, the local driver 106 cryptographically signs the MD command 130, for example, using a MAC cryptographic key as described herein. At operation 508, the local driver 106 sends the MD command 130 to the memory device 104 (e.g., the PUF utility 120 thereof).

The memory device 104 receives the MD command 130 and verifies the digital signature of the MF command 130 at operation 510. In some examples, firmware of the memory device 104 uses the MD command 130 to call the PUF utility 120 for executing the command. This can occur before or after verification. At operation 512, the PUF utility 120 executes the command at the PUF 124. Depending on the command, this may generate PUF data. If PUF data is generated, the PUF utility encrypts the PUF data at optional operation 514. The PUF data can be encrypted, for example, utilizing a host public key provided to the memory device 104 as described herein. The memory device 104 and/or PUF utility 120 sends a MD reply 132 to the local driver 106 at operation 516. This can include, for example, digitally signing the reply 132 using the MAC cryptographic key.

The local driver 106 receives the MD reply 132 and verifies its cryptographic signature at operation 518. Optionally, if the MD reply 132 includes PUF data, the local driver 106 decrypts the PUF data and writes it to the location or locations at the local memory indicated by the output pointer parameters (if any), at operation 520. The local driver 106 can decrypt the PUF data, for example, using the host private key. At operation 522, the local driver 106 sends a host reply 115 to the host application 110. The host reply 115 indicates the success (or failure) of the original host command 113. The host application 110 receives the reply at operation 524. If the reply 115 indicates that the command was successful, the host application can access the resulting PUF data from the local memory 108 at operation 526.

Figure 6:
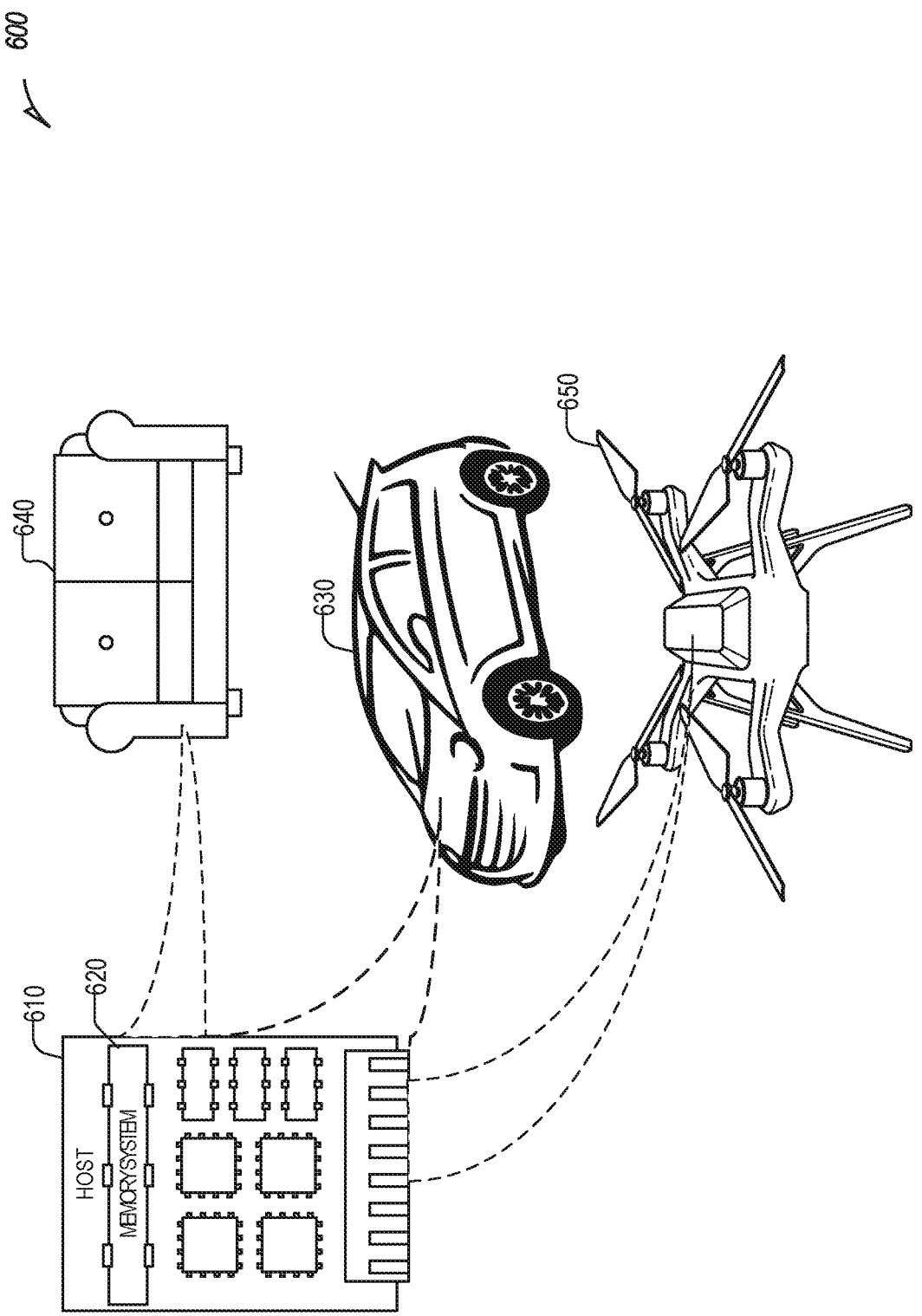
FIG. 6 shows an example processing system with a memory arrangement as part of one or more apparatuses.

FIG. 6 shows an example environment 600 including a processing system 610 (e.g., processing system 101) with a memory arrangement 620 (e.g., any of the memory arrangements described herein) as part of one or more apparatuses 630, 640, 650. Apparatuses include any device that may include a processing system, such as processing system 610. As previously noted, the processing system 610 may be any device capable of executing instructions (sequential or otherwise). Example apparatuses include a vehicle 630 (e.g., as part of an infotainment system, a control system, or the like), a drone 650 (e.g., as part of a control system), furniture or appliances 640 (e.g., as part of a sensor system, an entertainment or infotainment system), or the like. In other examples, although not shown, apparatuses may include aeronautical, marine, Internet of Things (IOT), and other devices.

Figure 7:
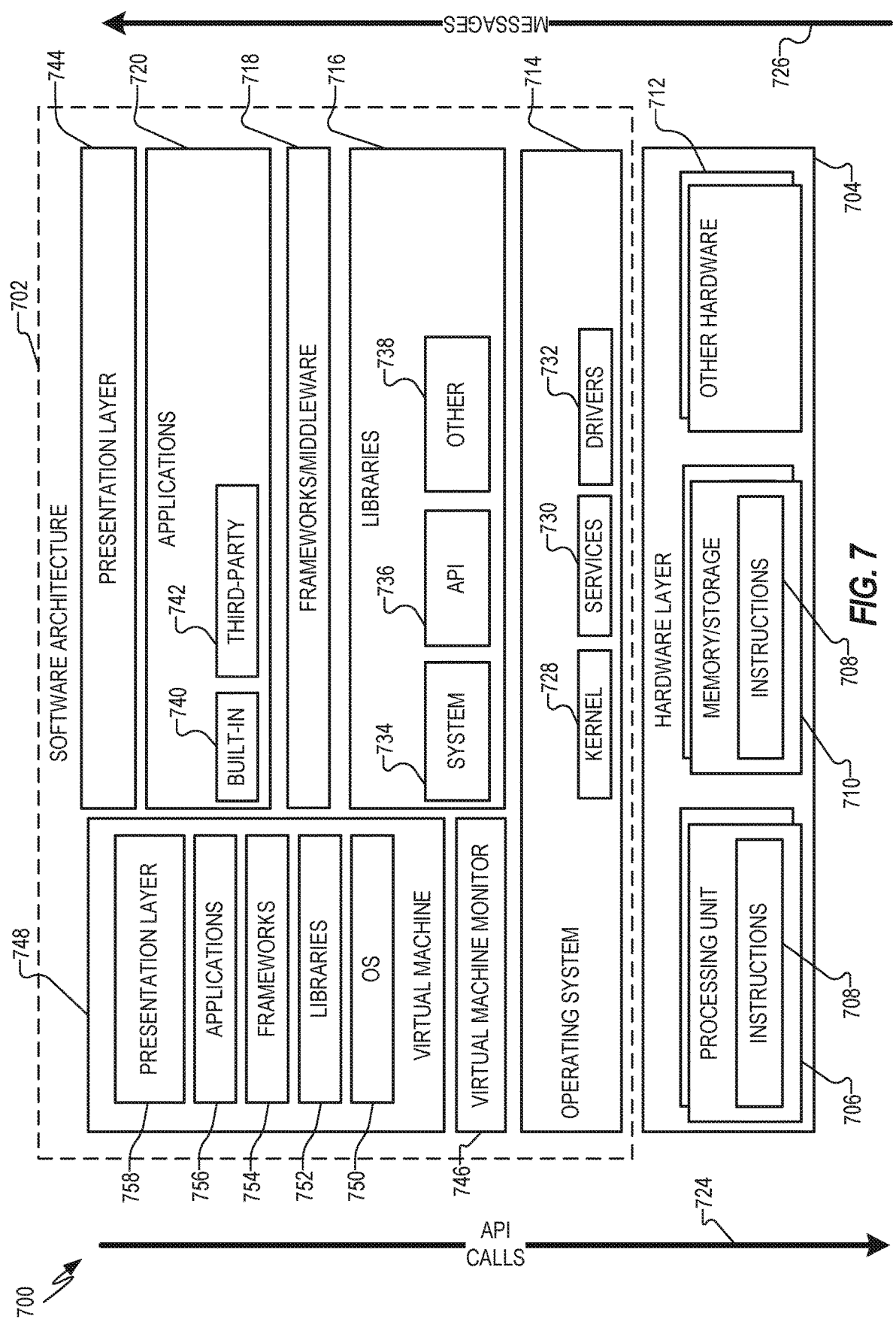
FIG. 7 is a block diagram showing one example of a software architecture for a computing device.

FIG. 7 is a block diagram 700 showing one example of a software architecture 702 for a processing device. The architecture 702 may be used in conjunction with various hardware architectures. For example, the software architecture 702 may describe the host device 102. FIG. 7 is merely a non-limiting example of a software architecture 702 and many other architectures may be implemented to facilitate the functionality described herein. A representative hardware layer 704 is illustrated and may represent, for example, any of the above referenced computing devices. In some examples, the hardware layer 704 may be implemented according to the architecture 702 of FIG. 7, the machine 800 of FIG. 8 and/or the architecture of the secure processing system 101 described herein.

The representative hardware layer 704 comprises one or more processing units 706 having associated executable instructions 708. Executable instructions 708 represent the executable instructions of the software architecture 702, including implementation of the methods, modules, components, and so forth of FIGS. 1-4. Hardware layer 704 also includes memory and/or storage modules 710, which also have executable instructions 708. Hardware layer 704 may also comprise other hardware as indicated by other hardware 712 which represents any other hardware of the hardware layer 704, such as the other hardware illustrated as part of hardware architecture 800.

In the example architecture of FIG. 7, the software 702 may be conceptualized as a stack of layers where each layer provides particular functionality. For example, the software 702 may include layers such as an operating system 714, libraries 716, frameworks/middleware 718, applications 720 and presentation layer 744. Operationally, the applications 720 and/or other components within the layers may invoke application programming interface (API) calls 724 through the software stack and receive a response, returned values, and so forth illustrated as messages 726 in response to the API calls 724. The layers illustrated are representative in nature and not all software architectures have all layers. For example, some mobile or special purpose operating systems may not provide a frameworks/middleware layer 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. In some examples, the services 730 include an interrupt service. The interrupt service may detect the receipt of a hardware or software interrupt and, in response, cause the architecture 702 to pause its current processing and execute an interrupt service routine (ISR) when an interrupt is received.

The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 716 may provide a common infrastructure that may be utilized by the applications 720 and/or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 716 may include system 734 libraries (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 9D in a graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) may provide a higher-level common infrastructure that may be utilized by the applications 720 and/or other software components/modules. For example, the frameworks 718 may provide various graphic user interface (GUI) functions, high-level resource management, high-level location services, and so forth. The frameworks 718 may provide a broad spectrum of other APIs that may be utilized by the applications 720 and/or other software components/modules, some of which may be specific to a particular operating system or platform.

The applications 720 includes built-in applications 740 and/or third party applications 742. Examples of representative built-in applications 740 may include, but are not limited to, a contacts application, a browser application, a book reader application, a location application, a media application, a messaging application, and/or a game application. Third party applications 742 may include any of the built in applications as well as a broad assortment of other applications. In a specific example, the third party application 742 (e.g., an application developed using the Android™ or iOS™ software development kit (SDK) by an entity other than the vendor of the particular platform) may be mobile software running on a mobile operating system such as IOS™, Android™, Windows® Phone, or other mobile computing device operating systems. In this example, the third party application 742 may invoke the API calls 724 provided by the mobile operating system such as operating system 714 to facilitate functionality described herein.

The applications 720 may utilize built in operating system functions (e.g., kernel 728, services 730 and/or drivers 732), libraries (e.g., system 734, APIs 736, and other libraries 738), frameworks/middleware 718 to create user interfaces to interact with users of the system. Alternatively, or additionally, in some systems interactions with a user may occur through a presentation layer, such as presentation layer 744. In these systems, the application/module "logic" may be separated from the aspects of the application/module that interact with a user.

Some software architectures utilize virtual machines. For example, systems described herein may be executed utilizing one or more virtual machines executed at one or more server computing machines. In the example of FIG. 7, this is illustrated by virtual machine 748. A virtual machine creates a software environment where applications/modules may execute as if they were executing on a hardware computing device. A virtual machine is hosted by a host operating system (operating system 714) and typically, although not always, has a virtual machine monitor 746, which manages the operation of the virtual machine as well as the interface with the host operating system (i.e., operating system 714). A software architecture executes within the virtual machine such as an operating system 750, libraries 752, frameworks/middleware 754, applications 756 and/or presentation layer 758. These layers of software architecture executing within the virtual machine 748 may be the same as corresponding layers previously described or may be different.

Figure 8:
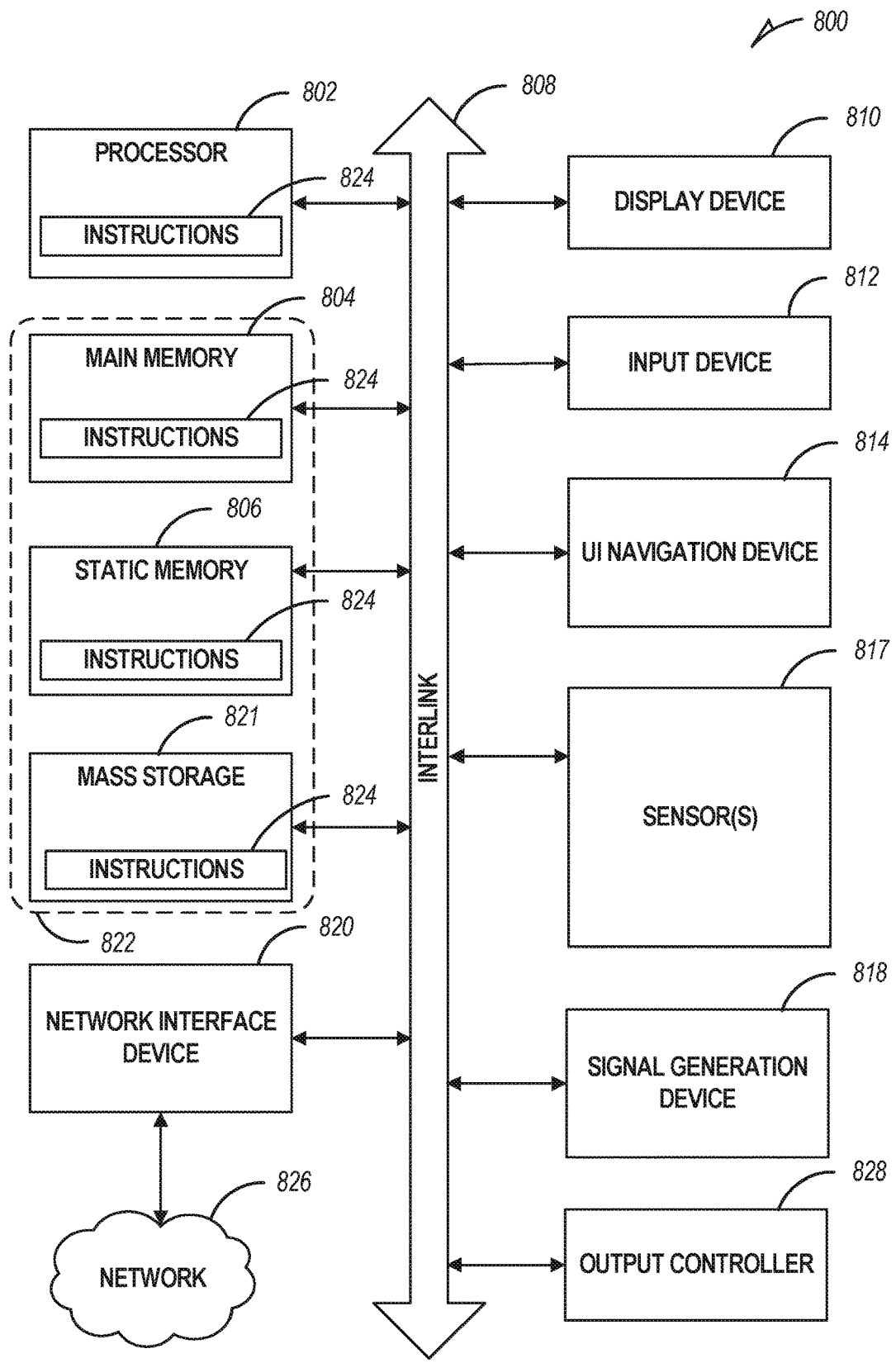
FIG. 8 is a block diagram illustrating a computing device hardware architecture, within which a set or sequence of instructions may be executed to cause the machine to perform examples of any one of the methodologies discussed herein.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a non-transitory computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 800 (e.g., host device 102, etc.) may include a hardware processor 802 (e.g., a central processing unit (CPU), a graphics processing unit (GPU), a hardware processor core, or any combination thereof, such as the memory controller 116, etc.), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 817, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. For example, the instructions 824 may be associated with a host application 110, local driver 106, PUF utility 120 or other suitable software. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute the machine readable medium 822.

While the machine readable medium 822 is illustrated as a single medium, the term "machine readable medium" may include a single medium or multiple media (e.g., a centralized or distributed database, or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine-readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 (e.g., software, programs, an operating system (OS), etc.) or other data are stored on the storage device 821, can be accessed by the memory 804 for use by the processor 802. The memory 804 (e.g., DRAM) is typically fast, but volatile, and thus a different type of storage than the storage device 821 (e.g., an SSD), which is suitable for long-term storage, including while in an "off" condition. The instructions 824 or data in use by a user or the machine 800 are typically loaded in the memory 804 for use by the processor 802. When the memory 804 is full, virtual space from the storage device 821 can be allocated to supplement the memory 804; however, because the storage 821 device is typically slower than the memory 804, and write speeds are typically at least twice as slow as read speeds, use of virtual memory can greatly reduce user experience due to storage device latency (in contrast to the memory 804, e.g., DRAM). Further, use of the storage device 821 for virtual memory can greatly reduce the usable lifespan of the storage device 821.

In contrast to virtual memory, virtual memory compression (e.g., the Linux kernel feature "ZRAM") uses part of the memory as compressed block storage to avoid paging to the storage device 821. Paging takes place in the compressed block until it is necessary to write such data to the storage device 821. Virtual memory compression increases the usable size of memory 804, while reducing wear on the storage device 821.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device, and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 824 may further be transmitted or received over a communications network 826 using a transmission medium via the network interface device 820 utilizing any one of a number of transfer protocols (e.g., frame relay, Internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" may include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The term "horizontal" as used in this document is defined as a plane parallel to the conventional plane or surface of a substrate, such as that underlying a wafer or die, regardless of the actual orientation of the substrate at any point in time. The term "vertical" refers to a direction perpendicular to the horizontal as defined above. Prepositions, such as "on," "over," and "under" are defined with respect to the conventional plane or surface being on the top or exposed surface of the substrate, regardless of the orientation of the substrate; and while "on" is intended to suggest a direct contact of one structure relative to another structure which it lies "on" (in the absence of an express indication to the contrary); the terms "over" and "under" are expressly intended to identify a relative placement of structures (or layers, features, etc.), which expressly includes—but is not limited to—direct contact between the identified structures unless specifically identified as such. Similarly, the terms "over" and "under" are not limited to horizontal orientations, as a structure may be "over" a referenced structure if it is, at some point in time, an outermost portion of the construction under discussion, even if such structure extends vertically relative to the referenced structure, rather than in a horizontal orientation.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate, but may instead be generally perpendicular to the surface of the substrate, and may form an acute angle with the surface of the substrate (e.g., between 60 and 120 degrees, etc.).

In some embodiments described herein, different doping configurations may be applied to a source-side select gate (SGS), a control gate (CG), and a drain-side select gate (SGD), each of which, in this example, may be formed of or at least include polysilicon, with the result such that these tiers (e.g., polysilicon, etc.) may have different etch rates when exposed to an etching solution. For example, in a process of forming a monolithic pillar in a 3D semiconductor device, the SGS and the CG may form recesses, while the SGD may remain less recessed or even not recessed. These doping configurations may thus enable selective etching into the distinct tiers (e.g., SGS, CG, and SGD) in the 3D semiconductor device by using an etching solution (e.g., tetramethylammonium hydroxide (TMCH)).

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

Example 1 is a system for providing a digital fingerprint of a selected portion of a memory device to a host device, comprising: a memory device; a host device comprising a local memory separate from the memory device, the host device to execute a driver and a host application, wherein the host device is configured to perform operations comprising: sending, by the host application and to the driver, a command to produce digital fingerprint data, the command including an output pointer to a memory location of the local memory for the digital fingerprint data to be written; generating, by the driver, a modified command, wherein the modified command does not includes the output pointer; sending, by the driver, the modified command to the memory device; receiving, by the driver, a reply comprising the digital fingerprint data describing a selected portion of the memory device; and writing the digital fingerprint data to a location at the memory location of the local memory indicated by the output pointer.

In Example 2, the subject matter of Example 1 optionally includes wherein the host device is further configured to perform operations comprising, before writing the digital fingerprint data to the location at the local memory indicated by the output pointer, decrypting the digital fingerprint data by driver using a host device public key.

In Example 3, the subject matter of any one or more of Examples 1-2 optionally includes wherein the command comprises an input parameter, and wherein the host device is further configured to perform operations comprising encrypting the input parameter based at least in part on a public key associated with the memory device.

In Example 4, the subject matter of any one or more of Examples 1-3 optionally includes wherein the host device is further configured to perform operations comprising sending an instantiate command to the memory device, wherein the instantiate command indicates an allocation size indicating an amount of memory at the memory device to be allocated to PUF.

In Example 5, the subject matter of Example 4 optionally includes wherein the instantiate command also indicates a host public key for encrypting digital fingerprint data at the memory device.

In Example 6, the subject matter of any one or more of Examples 1-5 optionally includes wherein the command is an enroll command, and wherein the digital fingerprint data comprises an activation code.

In Example 7, the subject matter of any one or more of Examples 1-6 optionally includes wherein the command comprises an activation code received in response to a prior command to the driver.

In Example 8, the subject matter of any one or more of Examples 1-7 optionally includes wherein the command comprises an indication of a cryptographic key type and wherein the digital fingerprint data comprises a cryptographic key of the cryptographic key type.

In any one or more of Examples 1-8, the digital fingerprint comprises a PUF and the digital fingerprint data can include PUF data.

Example 9 is a method for providing a digital fingerprint to a host device, comprising: sending, by a host application executing at the host device and to a driver executing at the host device, a command to produce digital fingerprint data, the command including an output pointer indicating a memory location of a local memory of the host device for the digital fingerprint data to be written; generating, by the driver, a modified command, wherein the modified command does not includes the output pointer; sending, by the driver, the modified command to an external memory device; receiving, by the driver, a reply comprising the digital fingerprint data; and writing the digital fingerprint data to a location at the memory location of the local memory indicated by the output pointer.

In Example 10, the subject matter of Example 9 optionally includes before writing the digital fingerprint data to the location at the local memory indicated by the output pointer, decrypting the digital fingerprint data by driver using a host device private key.

In Example 11, the subject matter of any one or more of Examples 9-10 optionally includes wherein the command comprises an input parameter, further comprising encrypting the input parameter based at least in part on a public key associated with the memory device.

In Example 12, the subject matter of any one or more of Examples 9-11 optionally includes sending an instantiate command to the memory device, wherein the instantiate command indicates an allocation size indicating an amount of memory at the memory device to be allocated to PUF.

In Example 13, the subject matter of Example 12 optionally includes wherein the instantiate command also indicates a host public key for encrypting digital fingerprint data at the memory device.

In Example 14, the subject matter of any one or more of Examples 9-13 optionally includes wherein the command is an enroll command, and wherein the digital fingerprint data comprises an activation code.

In Example 15, the subject matter of any one or more of Examples 9-14 optionally includes wherein the command comprises an activation code received in response to a prior command to the driver.

In Example 16, the subject matter of any one or more of Examples 9-15 optionally includes wherein the command comprises an indication of a cryptographic key type and wherein the digital fingerprint data comprises a cryptographic key of the cryptographic key type.

In any one or more of Examples 9-16, the digital fingerprint comprises a PUF and the digital fingerprint data can include PUF data.

Example 17 is a non-transitory computer-readable medium comprising instructions thereon that, when executed by a hardware processor, cause the hardware processor to perform operations comprising: sending, by a host application executing at the hardware processor and to a driver executing at the host device, a command to produce digital fingerprint data, the command including an output pointer indicating a memory location of local memory associated with the hardware processor for the digital fingerprint data to be written; generating, by the driver, a modified command, wherein the modified command does not includes the output pointer; sending, by the driver, the modified command to a memory device; receiving, by the driver, a reply comprising the digital fingerprint data; and writing the digital fingerprint data to a location at the memory location of the local memory indicated by the output pointer.

In Example 18, the subject matter of Example 17 optionally includes wherein the operations further comprise, before writing the digital fingerprint data to the location at the local memory indicated by the output pointer, decrypting the digital fingerprint data by driver using a host device private key.

In Example 19, the subject matter of any one or more of Examples 17-48 optionally includes wherein the command comprises an input parameter, and wherein operations further comprise encrypting the input parameter based at least in part on a public key associated with the memory device.

In Example 20, the subject matter of any one or more of Examples 17-19 optionally includes wherein the operations further comprise sending an instantiate command to the memory device, wherein the instantiate command indicates an allocation size indicating an amount of memory at the memory device to be allocated to PUF.

In any one or more of Examples 17-20, the digital fingerprint comprises a PUF and the digital fingerprint data can include PUF data.

What is claimed is:

1. A system for providing a digital fingerprint of a selected portion of a memory device to a host device, comprising:
   a memory device;
   a host device comprising a local memory separate from the memory device, the host device to execute a driver and a host application, wherein the host device is configured to perform operations comprising:
      sending, by the host application and to the driver, a command to produce digital fingerprint data, the command including an output pointer to a memory location of the local memory for the digital fingerprint data to be written;
      generating, by the driver, a modified command, wherein the modified command does not include the output pointer;
      sending, by the driver, the modified command to the memory device;
      receiving, by the driver, a reply comprising the digital fingerprint data describing a selected portion of the memory device; and
      writing the digital fingerprint data to a location at the memory location of the local memory indicated by the output pointer.

2. The system of claim 1, wherein the host device is further configured to perform operations comprising, before writing the digital fingerprint data to the location at the local memory indicated by the output pointer, decrypting the digital fingerprint data by the driver using a host device private key.

3. The system of claim 1, wherein the command comprises an input parameter, and wherein the host device is further configured to perform operations comprising encrypting the input parameter based at least in part on a public key associated with the memory device.

4. The system of claim 1, wherein the host device is further configured to perform operations comprising sending an instantiate command to the memory device, wherein the instantiate command indicates an allocation size indicating an amount of memory at the memory device to be allocated to PUF.

5. The system of claim 4, wherein the instantiate command also indicates a host public key for encrypting digital fingerprint data at the memory device.

6. The system of claim 1, wherein the command is an enroll command, and wherein the digital fingerprint data comprises an activation code.

7. The system of claim 1, wherein the command comprises an activation code received in response to a prior command to the driver.

8. The system of claim 1, wherein the command comprises an indication of a cryptographic key type and wherein the digital fingerprint data comprises a cryptographic key of the cryptographic key type.

9. A method for providing a digital fingerprint to a host device, comprising:
   sending, by a host application executing at the host device and to a driver executing at the host device, a command to produce digital fingerprint data, the command including an output pointer indicating a memory location of a local memory of the host device for the digital fingerprint data to be written;
   generating, by the driver, a modified command, wherein the modified command does not include the output pointer;
   sending, by the driver, the modified command to an external memory device;
   receiving, by the driver, a reply comprising the digital fingerprint data; and
   writing the digital fingerprint data to a location at the memory location of the local memory indicated by the output pointer.

10. The method of claim 9, further comprising, before writing the digital fingerprint data to the location at the local memory indicated by the output pointer, decrypting the digital fingerprint data by driver using a host device private key.

11. The method of claim 9, wherein the command comprises an input parameter, further comprising encrypting the input parameter based at least in part on a public key associated with the memory device.

12. The method of claim 9, further comprising sending an instantiate command to the memory device, wherein the instantiate command indicates an allocation size indicating an amount of memory at the memory device to be allocated to PUF.

13. The method of claim 12, wherein the instantiate command also indicates a host public key for encrypting digital fingerprint data at the memory device.

14. The method of claim 9, wherein the command is an enroll command, and wherein the digital fingerprint data comprises an activation code.

15. The method of claim 9, wherein the command comprises an activation code received in response to a prior command to the driver.

16. The method of claim 9, wherein the command comprises an indication of a cryptographic key type and wherein the digital fingerprint data comprises a cryptographic key of the cryptographic key type.

17. A non-transitory computer-readable medium comprising instructions thereon that, when executed by a hardware processor, cause the hardware processor to perform operations comprising:
   sending, by a host application executing at the hardware processor and to a driver executing at the host device, a command to produce digital fingerprint data, the command including an output pointer indicating a memory location of local memory associated with the hardware processor for the digital fingerprint data to be written;

generating, by the driver, a modified command, wherein the modified command does not include the output pointer;

sending, by the driver, the modified command to a memory device;

receiving, by the driver, a reply comprising the digital fingerprint data; and writing the digital fingerprint data to a location at the memory location of the local memory indicated by the output pointer.

18. The medium of claim 17, wherein the operations further comprise, before writing the digital fingerprint data to the location at the local memory indicated by the output pointer, decrypting the digital fingerprint data by driver using a host device private key.

19. The medium of claim 17, wherein the command comprises an input parameter, and wherein operations further comprise encrypting the input parameter based at least in part on a public key associated with the memory device.

20. The medium of claim 17, wherein the operations further comprise sending an instantiate command to the memory device, wherein the instantiate command indicates an allocation size indicating an amount of memory at the memory device to be allocated to PUF.

* * * * *